April 15, 1952 J. PHILIPSON 2,592,949
CABLE SEAL
Filed Dec. 30, 1946
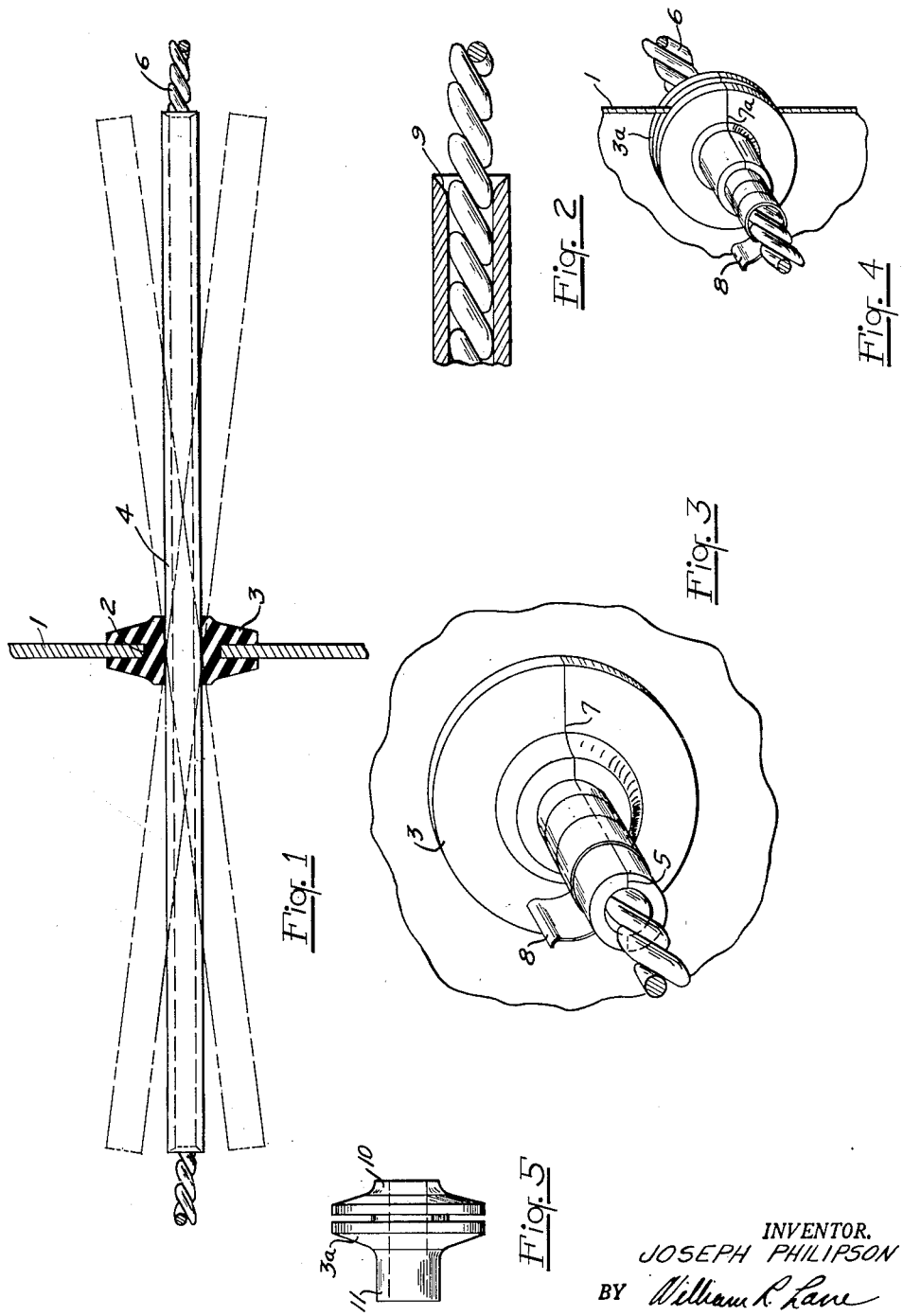
INVENTOR.
JOSEPH PHILIPSON
BY William R. Lane
ATTORNEY Patented Apr. 15, 1952

2,592,949

UNITED STATES PATENT OFFICE 2,592,949

CABLE SEAL

Joseph Philipson, Los Angeles, Calif., assignor to North American Aviation, Inc.

Application December 30, 1946, Serial No. 719,233

1 Claim. (Cl. 286—16)

This invention relates to a means for sealing a cable outlet in a wall separating high and low pressure areas.

The invention particularly relates to a device for effectively sealing cable outlets in a pressurized cabin.

In the past considerable difficulty has been experienced in satisfactorily sealing such cable outlets. Seals have been formed of resilient material, such as leather, sponge rubber, neoprene, and the like, and constructed on the principle of a wiping action. This results not only in a relatively high frictional resistance to the operation of the cables, but also in considerable difficulty in low temperature operations and particularly if lubrication is attempted. Friction loads and wear also increase under these circumstances.

It is therefore an object of this invention to provide a seal which has substantially no frictional resistance and which operates effectively at low, as well as high temperatures.

It is a further object of this invention to provide a seal which is light in weight, simple in construction, and easy to install.

It is still a further object of this invention to provide a seal comprising tubing of such length and clearance with respect to a control cable or rod extended therethrough that the frictional resistance to flow therein provides an effective seal against substantial loss of air from a pressurized cabin.

It is another object of this invention to provide a sealing arrangement which does not necessarily require special machining and in respect of which commercial grades of tubing, cables, and other materials may be used.

It is still another object of this invention to provide a cable seal which is self-aligning and at the same time provides substantially no frictional resistance to the sliding of cables contained therein.

It is yet another object of this invention to provide a grommet for use with my tube seal which provides a support for the tube and also effectively seals the outlet.

Other objects of the invention will become apparent from the following description and drawings, in which, Fig. 1 is an elevational view, partly in section, illustrating my invention;

Fig. 2 is a cross-sectional view through a part of the tube used as a seal in this invention, and of a cable contained therein, in elevation, Fig. 3 is a perspective view of the seal projecting from a pressurized cabin;

Fig. 4 is a perspective view of a modified grommet used with the seal, and

Fig. 5 is a side elevational view of the grommet in Fig. 4.

Referring to the drawings, the wall 1 of a pressurized cabin is provided with an opening 2 in which there is placed a grommet 3 of relatively soft rubber or like material for receiving a tube 4. Grommet 3 is suitably sealed in the wall 1 by means of a caulking compound, or other material placed on the pressurized side of wall 1 (right side in Fig. 1), while tube 4 is relatively tightly received in the grommet 3, but with freedom for limited swinging movement as indicated in dotted lines in Fig. 1. This swinging movement is obtained by deformation of the rubber in the grommet. Slidably received within the tube 4 is a cable 6 (which may be a control cable for aircraft) having an exterior diameter but slightly less than the interior diameter of the tube 4. The tube 4 is made of such a length that the frictional resistance to flow of air therethrough provides a seal against excessive leakage of pressure from the interior to the exterior of the cabin defined by wall 1. Since no pressure cabin installation is completely tight, but is designed for certain permissible leakage, by properly selecting a length and diameter of tubing, this leakage can be maintained within permissible limits and at the same time provide a seal which is not only effective, but which is relatively free from friction and independent of temperature conditions. Mounting of the tube in the rubber grommet 3 permits the tube to be self-aligning so as to avoid frictional drag of the cable thereon. It has been found that a very light contact between the edge of the tube and the cable maintains this alignment, this being facilitated by the lightness of the tube and the characteristics of the self-aligning mounting.

For convenience in assembling, the tube 4 may be split at 5 and wrapped with tape or binding material 8. The installation is thereupon accomplished by placing the two halves in position about the cable and wrapping the entire length with tape or binder 8 which may then be coated with a lacquer or other suitable material to completely seal the halves. The grommet 3 may be integral or it may be split as at 7 in Fig. 3 for convenience in assembling and removal. If split, it will be necessary to seal the same by coating it with a suitable material, such as lacquer.

In installation and operation the grommet 3 is placed in a suitable opening 2 in a wall or partition 1 of a container or cabin, one side of which is maintained at a higher pressure than the other side. Tube 4 is inserted in the opening in the grommet, the latter sealingly gripping the tube in assembled position while permitting lateral movement of the tube by reason of the softness of the elastic material forming the grommet. Cable 6 is then threaded through the tube to constitute a final assembly of the seal. In instances where a split tube and grommet are used, the grommet is placed over the cable and the two halves of the tube are placed around the cable. The halves of the tube are then slid into the grommet to a position similar to that in Fig. 1 and wrapped with tape or other suitable binding 8 as shown in Fig. 3.

Tube 4 is selected of such a length that the frictional resistance to air flow with the cable contained therein is such that the amount of air loss through the tube is not substantial and therefore within permissible limits, especially when used in connection with a pressurized cabin for aircraft. This loss has been found to be substantially constant irrespective of temperature and independent of pressure when the ratio of cabin pressure to atmospheric pressure is greater than or equal to approximately 1.89. This phenomenon may be explained by reason of a built-up turbulence in the tube which may be said to be in the supersonic range in the rate of flow through an orifice, and by the further fact that only a certain amount of fluid can flow through an orifice and that therefore such amount cannot vary directly with increased pressure differential. This sealing means is therefore particularly effective in extremely high altitudes where a larger pressure differential is obtained between cabin and atmospheric pressures, leakage being relatively independent of pressure differential at altitudes where mentioned ratio of 1.89 is maintained or exceeded. In fact the seal is relatively more effective at higher altitudes because of the fact that the leakage rate is measured as the difference between the squares of the pressures inside and outside the cabin. Leakage rate is computed on the basis of such difference divided by a constant which is a function of the characteristics of the cable and the tube and the conditions under which the system is used, such as temperature and the like. At high altitudes, therefore, the difference between the squares of the inside and outside pressures is smaller than at lower altitudes (even though the numerical difference between these pressures may be the same), resulting in the construction covered by this invention providing a seal having a leakage rate which decreases with increase in altitude where the difference in pressure between the inside and outside of the cabin remains substantially constant. This result obtains, of course, by reason of the fact that the pressures at higher altitudes are smaller and, for a given pressure difference at different altitudes, the difference between the squares of such pressures will at higher altitudes be smaller than at lower altitudes.

In a specific embodiment of the invention $\frac{1}{16}$-inch diameter cable placed within a $\frac{5}{16}$-inch outside diameter tube resulted in a clearance between outside of cable and inside of tube of approximately 0.2 inch. The loss in cubic feet per minute at a pressure differential of 6.55 pounds per square inch above atmospheric pressure was found to be—for a tube 18″ long—approximately .80 cubic foot per minute, irrespective of temperature. Increasing the length of the tubing results in a somewhat smaller loss but rapidly approaches a diminishing return considering weight, space requirements, and the slight decrease in leakage over a shorter section of tubing. Where an exceptionally short section of tubing is required the control cable (or rod) and tubing may be machined to obtain a clearance of approximately .002 inch in which case, for a pressure differential of 2.75 pounds per square inch, such as is used in pressurized cockpits of fighter planes, a length of tubing of approximately four inches has been found to be satisfactory. Under these conditions, the leakage amounted to less than one cubic foot per minute at low altitudes and a smaller amount at higher altitudes.

A special type of grommet 3a, as shown in Figs. 4 and 5, facilitates supporting of the tube and sealing of the grommet in the wall by reason of the fact that a short tube engaging portion is provided for the pressure side of the cabin to facilitate sealing. This is particularly desirable where a grommet split as at 7a is used. On the opposite side of the grommet the tube engaging portion is extended at 11 to provide an adequate support therefor.

Although the invention has been described and illustrated in detail, it is to be clearly understood that the same is by way of illustration and example only and is not to be taken by way of limitation, the spirit and scope of this invention being limited only by the terms of the appended claim.

I claim:

In combination with a wall of a pressurized airplane cabin, a control element, said wall being provided with an aperture for receiving said control element, a grommet in said aperture, a tube surrounding said control element and tightly received in the eyelet of said grommet with one end projecting within and the other end without the cabin, said tube being open at its ends, of slightly greater diameter than said control element to avoid friction between said tube and said control element and of such a length that the resistance to flow through the remaining space therein is sufficiently great to prevent substantial loss of air therethrough, said grommet being formed of a material which is readily deformable and which retains its resiliency over a large temperature range, such as encountered both on the ground and at high altitudes, thereby to permit said tube to align itself with respect to said control element under all such temperature conditions.

JOSEPH PHILIPSON.

REFERENCES CITED

The following references are of record in the file of this patent:

UNITED STATES PATENTS

| Number | Name | Date |
|---|---|---|
| 143,280 | Finton | Sept. 30, 1873 |
| 1,336,030 | Gammeter | Apr. 6, 1920 |
| 1,503,782 | Barnes | Aug. 5, 1924 |
| 1,747,592 | Morlang | Feb. 18, 1930 |
| 1,821,096 | Hicks et al. | Sept. 1, 1931 |
| 1,865,007 | Hicks et al. | June 28, 1932 |
| 1,903,093 | Crickmer | Mar. 28, 1933 |
| 2,069,443 | Hill | Feb. 2, 1937 |